UNITED STATES PATENT OFFICE.

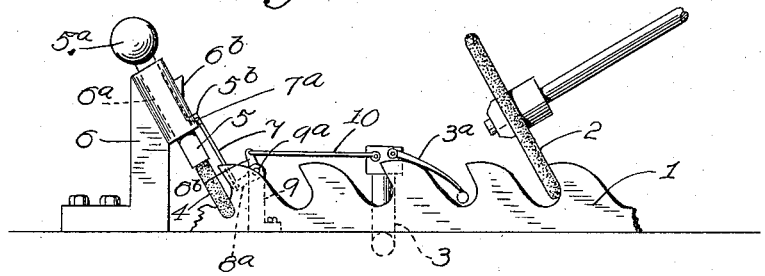

JAMES H. MINER, OF LUMBERTON, MISSISSIPPI.

SAW-SHARPENING MACHINE.

1,159,064.  Specification of Letters Patent.  Patented Nov. 2, 1915.

Application filed October 17, 1914. Serial No. 867,203.

*To all whom it may concern:*

Be it known that I, JAMES H. MINER, citizen of the United States, residing at Lumberton, Mississippi, have invented certain new and useful Improvements in Saw-Sharpening Machines, of which the following is a specification.

My invention relates to an improved attachment for automatic saw sharpening machines such as are used more particularly for sharpening band saws, and is designed to bevel or round the throat on one side of the band saw with a view to preventing the cracking of the bottom or base of the throats of the teeth, which frequently happens due to the constant bending of the band saw when passing around the drive pulleys. I have discovered that by beveling the throats of the teeth at one side this tendency to crack will be avoided, and the object of the invention is to provide a simple, economical and efficient attachment which can be easily applied to the ordinary saw sharpening machine for producing this rounding or beveling action.

The invention includes the novel features of construction and arrangement and combination of parts hereinafter described and particularly pointed out in the appended claims.

The invention is illustrated by the aid of the accompanying drawings, in which—

Figure 1 is a front elevation of my attachment in operative relation with a portion of a band saw in process of sharpening, only a sufficient portion of the saw sharpening machine being shown to illustrate how the attachment coöperates therewith; Fig. 2 is a similar view with the parts in the position which they will assume when the saw sharpening disk is raised and the band saw is being fed forward to bring the next tooth into line; and Fig. 3 is a detail sectional elevation taken transversely to the saw blade, and Fig. 4 a detail.

Referring by reference characters to this drawing, the numeral 1 designates the band saw which is being sharpened, and 2 the sharpening wheel of an ordinary sharpening machine, which is shown in position against the edge of one of the teeth being sharpened in Fig. 1, on its down stroke, and raised from the tooth in Fig. 2 to permit the feed of the saw to bring a fresh tooth into position to be sharpened. 3 indicates the ordinary feed finger arm to which is attached the feed finger $3^a$. As these parts are designed to be of the ordinary construction and operate in a manner well known
to those familiar with saw sharpening machines, further illustration and description thereof is deemed unnecessary. In order to bevel or round the edge of the throats at the point indicated at $1^a$ in Fig. 3, I provide a reciprocating tool or device of abrasive material shown at 4 slidingly supported at a suitable angle, and adapted to be automatically raised and lowered so as to cause it to pass across the edge $1^a$ and act as a file thereon. This tool or device might be reciprocated in various ways, but a very convenient manner of effecting this is to carry the tool or device 4 in the lower end of a slidable member 5 guided in the socket $6^a$ of a standard 6. The upper end of the slide 5 may be provided with a weight $5^a$ to cause it to move downward with sufficient force to have the required abrading action on a single downward stroke. In order to raise the slide it is provided with a projection or pawl $5^b$ which extends through a slot in the socket $6^a$, and is adapted to be engaged by the end of a rod 7, the other end of which rod is connected to the one arm $8^a$ of a bell crank lever pivoted at $9^a$ to a bracket 9. The other arm $8^b$ of this bell crank lever is connected by a link 10 with the feed finger arm 3, so that as the feed finger arm moves to the right from the position shown in Fig. 1 through the link, bell crank and rod 7 engaging with the projection $5^b$ pushes the slide 5 upwardly into the position shown in Fig. 2. As the slide nears the limit of its upward movement, the lateral projection $7^a$ on the rod rides upon the faces of inclined projections $6^b$ on the socket piece 6, and lifts the rod out of engagement with the projection $5^b$, so that the weighted slide will drop and the abrasive tool 4 be brought into sliding engagement with the throat of the saw in the manner indicated in Fig. 3. Thereafter the reverse movement of the feed finger arm 3 pulls down on the rod 7 until its end again engages the projection $5^b$, when it will push it up again into its elevated position.

The detail construction of the projection $6^b$ and engaging end of the rod 7 is shown in Fig. 4, in which it will be seen that the end of the rod 7 has a pair of lateral projections or fingers on either side adapted to coöperate with the inclines $6^b$, and a central portion or lip to engage the projection 5ᵇ.

I claim as my invention:—

1. In combination with the grinder and feed mechanism of a saw sharpening machine, a throat beveling device having a curved abrasive face, and connections between said throat beveling device and said feed mechanism whereby said throat beveling device is automatically operated from said feed mechanism, substantially as described.

2. In combination with the grinding wheel and saw feeding mechanism of an automatic saw sharpener, a substantially cylindrical reciprocating abrasive device for operating successively on the throats of the saw teeth, and means controlled by said feed mechanism for effecting the reciprocation of said abrasive device, substantially as described.

3. In combination with the grinding wheel and saw feeding mechanism of an automatic saw sharpener, a weighted reciprocating abrasive device for operating successively on the throats of the saw teeth, and means controlled by said feed mechanism for raising and releasing said device.

4. In combination with the grinding wheel and feed mechanism of a saw grinding machine, a throat grinding device comprising a weighted slide carrying an abrasive part, a reciprocating pawl engaging a lug on said slide, means for operating said pawl in unison with the saw feed mechanism, and means for disengaging the pawl from the slide on the limit of its upward movement.

In testimony whereof I affix my signature in presence of two witnesses.

JAMES H. MINER.

Witnesses:
W. P. HAYNES,
GEO. H. ROBERTSON.

Copies of this patent may be obtained for five cents each, by addressing the "Commissioner of Patents, Washington, D. C."